United States Patent [19]

DeBlasi et al.

[11] Patent Number: 5,769,464
[45] Date of Patent: Jun. 23, 1998

[54] FLEXIBLE JOINT FOR METALLIC PIPES

[75] Inventors: Italo DeBlasi, Manilla; Stanley Livshitz, Willowdale, both of Canada

[73] Assignee: Titeflex Canada Ltd., Richmond Hill, Canada

[21] Appl. No.: 639,059

[22] Filed: Apr. 24, 1996

[51] Int. Cl.⁶ ............................... F16L 27/11; F16L 27/04
[52] U.S. Cl. ............................................ 285/226; 285/261
[58] Field of Search ..................................... 285/114, 226, 285/261

[56] References Cited

U.S. PATENT DOCUMENTS

| | | |
|---|---|---|
| 1,382,245 | 6/1921 | Russell et al. |
| 2,427,456 | 9/1947 | Hoy |
| 2,437,385 | 3/1948 | Halford |
| 2,451,252 | 10/1948 | Stoeckly |
| 2,604,339 | 7/1952 | Kaysing et al. |
| 2,616,728 | 11/1952 | Pitt |
| 2,712,456 | 7/1955 | McCreery |
| 2,840,394 | 6/1958 | Rohr |
| 2,998,270 | 8/1961 | Watkins |
| 3,369,829 | 2/1968 | Hopkins |
| 4,480,857 | 11/1984 | Graves ............................ 285/226 X |
| 4,643,463 | 2/1987 | Halling et el. ...................... 285/226 |
| 4,659,117 | 4/1987 | Holzhausen et al. ................. 285/49 |
| 4,906,027 | 3/1990 | De Gruijter ........................ 285/51 |
| 5,069,487 | 12/1991 | Sheppard .......................... 285/226 |
| 5,145,215 | 9/1992 | Udell ............................. 285/49 |
| 5,203,593 | 4/1993 | Brandener ......................... 285/49 |
| 5,318,329 | 6/1994 | Suzuki et al. ..................... 285/49 |
| 5,340,165 | 8/1994 | Sheppard ......................... 285/226 |
| 5,611,577 | 3/1997 | Meyer et al. ..................... 285/226 X |

FOREIGN PATENT DOCUMENTS

| | | | |
|---|---|---|---|
| 658066 | 5/1929 | France | ............................ 285/226 |
| 2203437 | 8/1972 | Germany | .......................... 285/226 |
| 2156932 | 10/1985 | United Kingdom | ............. 285/261 |

*Primary Examiner*—John A. Ricci
*Attorney, Agent, or Firm*—Ridout & Maybee

[57] ABSTRACT

A flexible gas tight pipe coupling has interengaging pipe sections, an end portion of one of which is expanded to form a spheroidal barrel, and an end portion of the other of which is inserted in the barrel and itself expanded to form a spheroidal barrel loosely trapped within the first barrel. A bellows and a protective tubular braid are secured to the pipe sections to provide a gas tight cover over the coupling.

7 Claims, 1 Drawing Sheet

1

FLEXIBLE JOINT FOR METALLIC PIPES

BACKGROUND OF THE INVENTION

1. Field of the Invention

This invention relates to flexible joints for metallic pipes, particularly but not exclusively exhaust pipes for internal combustion engines.

2. Background of the Invention

It is frequently necessary in applications, such as exhaust pipes for internal combustion engines in automotive vehicles, to provide flexible joint in otherwise substantially rigid metallic pipes. For example, automotive engines are normally flexibly mounted to the vehicle structure, while much of the exhaust system will be supported from the vehicle structure by flexible mountings which may not be able to accommodate relative movement between the engine and the vehicle structure without applying excessive stress to the exhaust system. This is particularly the case with transversely mounted engines, or applications in which high torque reactions may be applied to the engine causing substantial movement of the engine assembly relative to the vehicle structure., Flexible joints for this purpose must be gas-tight, durable, and may have to accommodate or sustain several different types of relative motion or forces between the pipe sections they connect, including angular, axial, rotational, and radial motion. Typically, modern joints of this type are formed in three concentric layers, an inner tubular structure providing a gas passage and interengagement of the pipes, a gas tight bellows covering the tubular structure, and (usually) a flexible metallic tubular non-load bearing braid providing cover for the bellow.

In order to provide accommodation for relative angular or other motions, many such flexible joints include either some form of ball joint between the pipe sections, or some other internal or external articulation between the pipe sections. Examples of such joints are to be found in U.S. Pat. Nos. 2,427,456 (Hoy); 2,437,385 (Halford); 2,604,339 (Kaysing et al); 2,616,728 (Pitt); 2,712,456 (McCreery); 2,840,394 (Rohr); 2,998,270 (Watkins); 3,369,829 (Hopkins); 4,659,117 (Holzhausen et al); 5,069,487 (Sheppard); 5,145,215 (Udell); 5,318,329 (Suzuki et al); and 5,340,165 (Sheppard). Other examples of pipe connections utilizing ball or similar joints are to be found in U.S. Pat. Nos. 1,382,245 (Russell et al); 4,906,027 (De Gruijter); and 5,203,593 (Brandener). The constructions shown in the foregoing patents exhibit varying degrees of complexity in construction and fabrication, and most of those utilizing ball joints require the use of some form of packing or packing member in the joint which must be introduced during assembly and will be subject to wear.

SUMMARY OF THE INVENTION

It is an object of the present invention to provide a flexible pipe joint incorporating a ball joint, which pipe joint is easy to fabricate, requires no packing, and which can be fabricated to accommodate angular motion between pipes to be coupled together with a predetermined degree of accommodation of other forms of relative motion between the pipes.

According to the invention, a flexible gas tight pipe joint comprises a first pipe section of ductile metal having a first end portion expanded into a first spheroidal barrel, having an end orifice of predetermined diameter at an open end of said end portion and a maximum internal diameter greater than the diameter of said end orifice, a second oppositely directed pipe section of ductile metal having a second end portion initially of lesser external diameter than said end orifice of the first end portion, said second end portion having been inserted within said barrel and expanded herein to provide a second spheroidal barrel of maximum external diameter less than the maximum internal diameter of the first barrel, but greater than the diameter of said end orifice, and an external gas tight bellows connected to said pipe sections outwardly of said end portions to provide a gas tight connection between the pipe sections.

This arrangement enables a ball joint to be fabricated easily between the pipe sections, and permits angular motion between the sections, but limits relative axial and radial motion, without requiring any packing in the ball joint. The degree of axial and radial motion permitted can be adjusted by selecting the internal dimensions of the first barrel and the external dimensions of the second barrel, namely the maximum diameters and the longitudinal radii of the circumferences of the barrels. The radii should usually be similar, and centred on the longitudinal axis of the joint so as to avoid excessive localization of contact between the barrels which may result in rattling or excessive local wear, but may be selected in conjunction with the diameter to provide a desired degree of longitudinal and axial accommodation in the joint.

Further features of the invention will become apparent from the following description of a presently preferred embodiment of the invention.

IN THE DRAWINGS

DESCRIPTION OF THE PREFERRED EMBODIMENT

Figure 1:
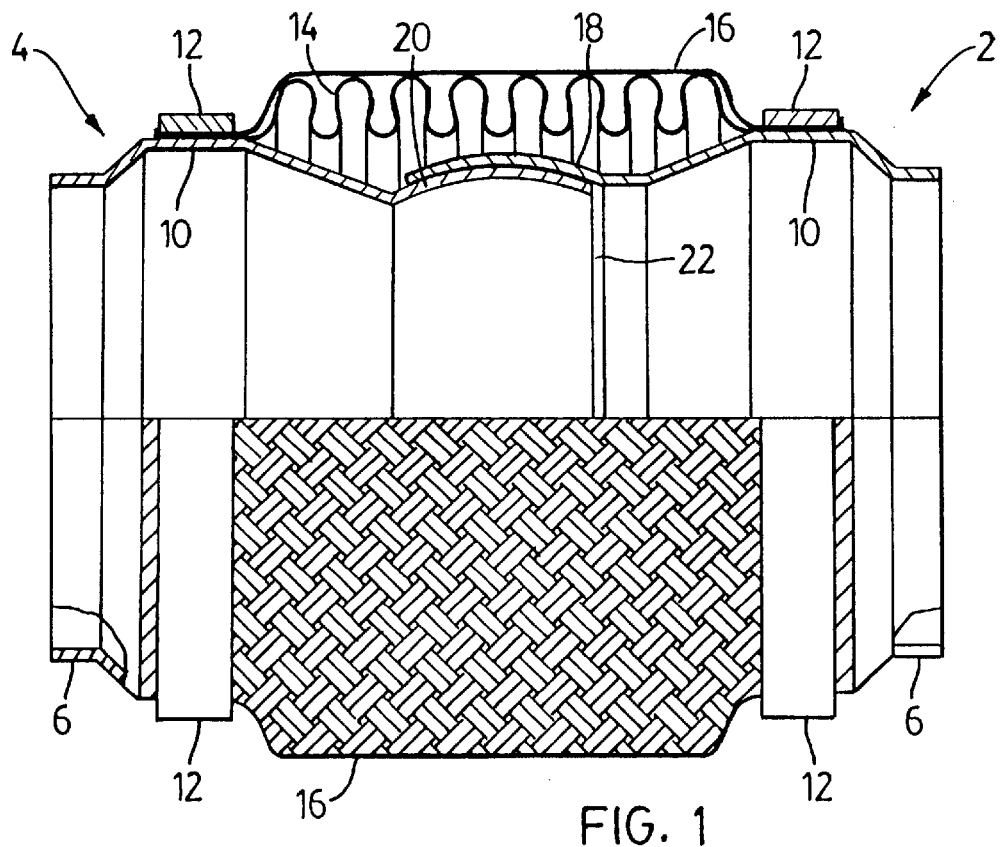
FIG. 1 is a longitudinal view of a pipe joint in accordance with the invention, partially sectioned to show the internal structure.
Figure 2:
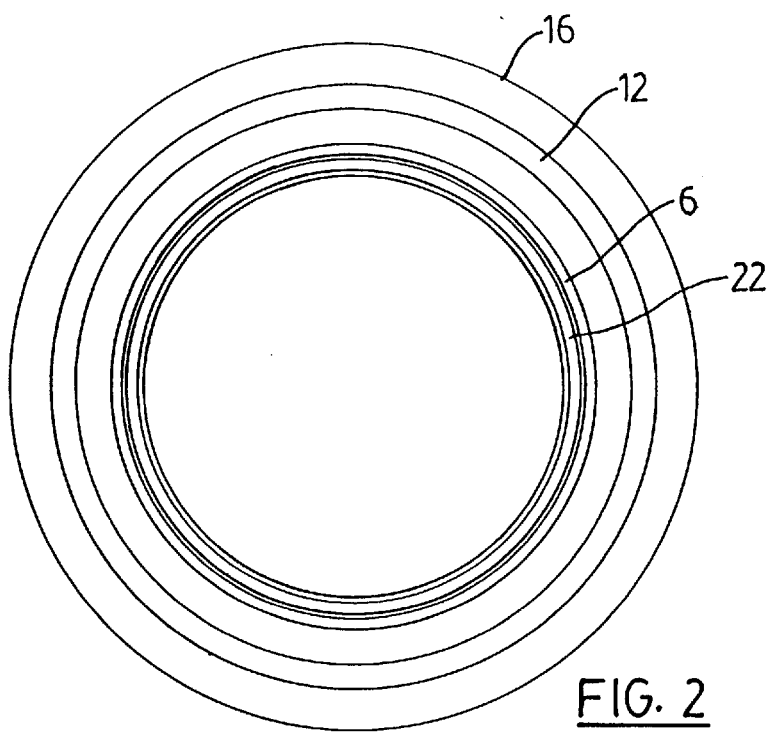
FIG. 2 is an end view of the joint of FIG. 1.

The joint shown in FIGS. 1 and 2 comprises two pipe sections 2 and 4 provided with cylindrical flanges 6 at their outer ends for welding to longer pipe sections forming part of a vehicle exhaust system. The pipe sections are formed of a steel or alloy steel having a degree of ductility sufficient to permit pipe forming operations such as expansion by an expansion mandrel: materials conventionally utilized for the fabrication of exhaust pipes are suitable. Stainless steel 409 is utilized in the example shown. The pipe section 4 to the left has an end portion which enters an end portion of the right hand pipe section 2 so as to provide a continuous gas passage through the joint.

The pipe section 2 is formed on an expansion mandrel so that its nominal diameter, exemplified by the flange 6, is expanded in two zones. In a first zone 10, the pipe is expanded within a ring 12 so as to retain one end of a bellows 14 and an external protective braid 16. In the example shown, the bellows is formed of INCONEL (trademark) alloy, and the rings and braid of stainless steel. In a second zone, an end portion of the pipe section 2 is expanded to from a spheroidal barrel 18, with an open end orifice 22 of internal diameter sufficient to admit the external diameter of an end portion of the pipe section 4, which end portion has a diameter less than the nominal diameter of the pipe section 2. The pipe section 4 is inserted into the pipe section 2 so that its end portion enters the barrel 18, and then expanded similarly to the pipe section 2. Thus a zone 10 is expanded within another ring 12 so as to lock the other ends of the bellows 14 and the braid 16, and the end portion is expanded to form a second spheroidal barrel 20 within the barrel 18. The degree of expansion is such that the barrel 20 has an external diameter less than the internal diameter of the barrel 18, but greater than the internal diameter of the orifice 22. The longitudinal internal and external radii of the spheroidal barrels 18 and 20 are preferably centered on the axis of the joint to provide a ball joint articulation between the pipe sections 2 and 4, but some deviation may be provided to control the characteristics of the joint. The difference between the internal diameter of the barrel 18 and the external diameter of the barrel 20 is selected to provide free movement between the ports and a desired degree of relative longitudinal movement, for example a range of about 5% of the nominal diameter of the pipe sections, which also implies a small degree of radial freedom of motion.

Figure 3:
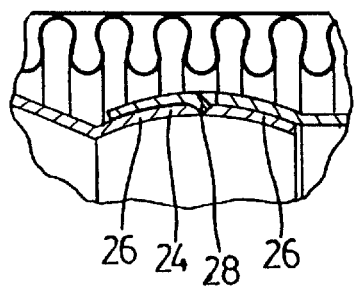
FIG. 3 is a fragmentary detail illustrating a modification of the embodiment of FIG. 1.

It may also be desired to control relative rotational movements of the pipe sections, and in the embodiment shown in FIG. 1 this is achieved by torque reaction provided by the bellows 14. In an experimental version of the joint, tabs formed by cuts in the barrel were struck inwards towards slots cut in the end portion of the pipe 4, so that as the latter was expanded to form the barrel 20, the tabs were pressed outwardly so as to fit into the slots. In practice, it was found on test that this arrangement caused rattling, probably because of the limited engagement surfaces between the tabs and the slots, and therefore it is presently preferred to rely on the bellows to restrain relative rotational motion, and the large area contacts between the radiused surfaces of the barrels 18 and 20 to control other relative movements since these provide progressive limitations of movement which does not cause rattling. If tabs and slots are utilized to restrain rotational movement, they should be designed as shown in FIG. 3, with slots 24 whose ends 26 are sufficiently spaced longitudinally that they are always clear of the tabs 28 during normal use of the joint upon angular or longitudinal relative motion between the pipe sections. The tabs in the slots 24 to 28 should be a sufficiently snug fit to eliminate relative rotational motion.

By utilizing a barrel 20 which is expanded in size into the barrel 18, permanent interengagement, and desired degrees of freedom of relative motion pipe sections can be obtained in an arrangement which is easy to manufacture, requires no packing, and which, because of the large radiused contact surfaces between the barrels, is resistant to rattling.

The embodiments of the invention in which an exclusive property or privilege is claimed are defined as follows:

1. A flexible gas tight pipe joint comprising a first pipe section of ductile metal having a first end portion expanded into a first spheroidal barrel, having an end orifice of predetermined diameter at an open end of said end portion and a maximum internal diameter greater than the diameter of said end orifice, a second oppositely directed pipe section of ductile metal having a second end portion initially of lesser external diameter than said end orifice of the first end portion, said second end portion having been inserted within said barrel and expanded therein to provide a second spheroidal barrel of maximum external diameter less than the maximum internal diameter of the first barrel, but greater than the diameter of said end orifice, and an external gas tight bellows connected to said pipe sections outwardly of said end portions to provide a gas tight connection between pipe sections; wherein the bellows is secured at its ends to said pipe sections by rings surrounding the ends of the bellows, and by portions of said pipe sections expanded within said ends and said rings.

2. A flexible joint according to claim 1, including a tubular metallic braid surrounding the bellows and extending between said rings and the bellows.

3. A flexible joint according to claim 1, wherein the barrels have spheroidal radii centred on a longitudinal axis of the coupling.

4. A flexible gas tight pipe joint comprising a first pipe section of ductile metal having a first end portion expanded into a first spheroidal barrel, having an end orifice of predetermined diameter at an open end of said end portion and a maximum internal diameter greater than the diameter of said end orifice, a second opposite directed pipe section of ductile metal having a second end portion initially of lesser external diameter than said end orifice of the first end portion, said second end portion having been inserted within said barrel and expanded therein to provide a second spheroidal barrel of maximum external diameter less than the maximum internal diameter of the first barrel, but greater than the diameter of said end orifice, and an external gas tight bellows connected to said pipe sections outwardly of said end portions to provide a gas tight connection between the pipe sections; wherein longitudinally directed tabs formed in the wall of one barrel enter longitudinally extending slots in the other barrel, the longitudinal distance between ends of the slots being great enough that the ends of the slots are always spaced from the tabs during regular angular or longitudinal movement between the pipe sections.

5. A flexible joint according to claim 4, wherein the bellows is secured at its ends to said pipe sections by rings surrounding the ends of the bellows, and by portions of said pipe sections expanded within said ends and said rings.

6. A flexible joint according to claim 5, including a tubular metallic braid surrounding the bellows and extending between said rings and the bellows.

7. A flexible joint according to claim 4, wherein the barrels have spheroidal radii centred on a longitudinal axis of the coupling.

* * * * *